G. F. BOLGIANO.
MACHINE FOR GRADUATING TIME RINGS.
APPLICATION FILED AUG. 8, 1917.

1,309,593.

Patented July 8, 1919.
9 SHEETS—SHEET 1.

Witness
Edwin L. Bradford

Inventor
Gilbert F. Bolgiano
By
Mann & Co.
Attorneys.

G. F. BOLGIANO.
MACHINE FOR GRADUATING TIME RINGS.
APPLICATION FILED AUG. 8, 1917.

1,309,593.

Patented July 8, 1919.
9 SHEETS—SHEET 9.

Witness
Edwin L. Bradford

Inventor
Gilbert F. Bolgiano
By
Mann & Co.
Attorneys.

UNITED STATES PATENT OFFICE.

GILBERT F. BOLGIANO, OF BALTIMORE, MARYLAND, ASSIGNOR TO THE BARTLETT HAYWARD COMPANY, OF BALTIMORE, MARYLAND, A CORPORATION OF MARYLAND.

MACHINE FOR GRADUATING TIME-RINGS.

1,309,593.      Specification of Letters Patent.      Patented July 8, 1919.

Application filed August 8, 1917. Serial No. 185,033.

*To all whom it may concern:*

Be it known that I, GILBERT F. BOLGIANO, a citizen of the United States, residing at Baltimore, in the State of Maryland, have invented certain new and useful Improvements in Machines for Graduating Time-Rings, of which the following is a specification.

This invention relates to an improved machine for graduating time-rings employed in fuses of projectiles.

One object of the invention is to provide a machine of such construction that a number of rings may be graduated simultaneously and without subjecting the rings to circumferential pressure that might possibly distort or make the ring untrue.

A further object of the invention is to provide improved means for successively cutting the graduations in the rings and to automatically vary the length of the cuts and arrange the graduations into proper divisions including long and short graduations.

A still further object is to provide improved mechanism for automatically varying the width of space between the graduations whereby the divisions between the long cuts or scores around the circumference of the ring may be unequal.

With these and other objects in view, the invention is illustrated in the accompanying drawings wherein,—

Referring to the drawings, and particularly Figs. 1, 2, 3 and 8, thereof, the numeral 30, designates a stationary horizontal table, in the present instance of a circular form, and provided with a central opening 31, in which a bushing 32, is snugly fitted from the upper side. A rest or post 33, has its lower end entering the bushing 32, and is provided with an annular flange 34, which seats on the upper end of the bushing, and said rest or post extends vertically above the table, for a purpose presently to be explained.

Directly over the table, the machine is provided with a circular carriage or disk 35, which has a central opening through which the vertical post projects, and said disk is recessed on its under side about the central opening so as to fit over the flange 34, on the post and thereby be sustained in a horizotnal plane with its bottom surface slightly elevated with respect to the top surface of the table. A series of balls 36, is retained in channels between the disk and table to sustain the disk with as little friction as possible and permit its ready step-by-step rotation, as will presently be explained.

Figure 3:
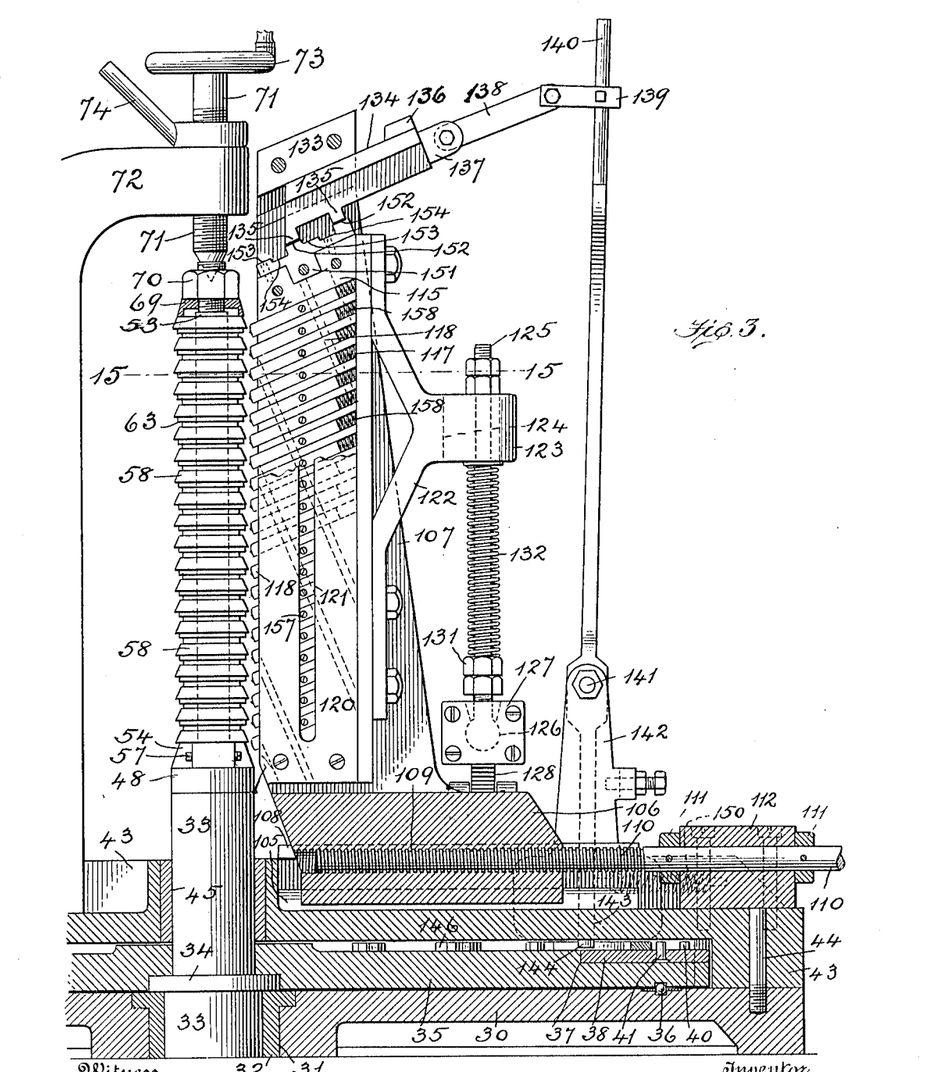
Fig. 3, shows an enlarged view partly in section and part front elevation through the cutting devices and the mechanism for operating the same.
Figure 19:
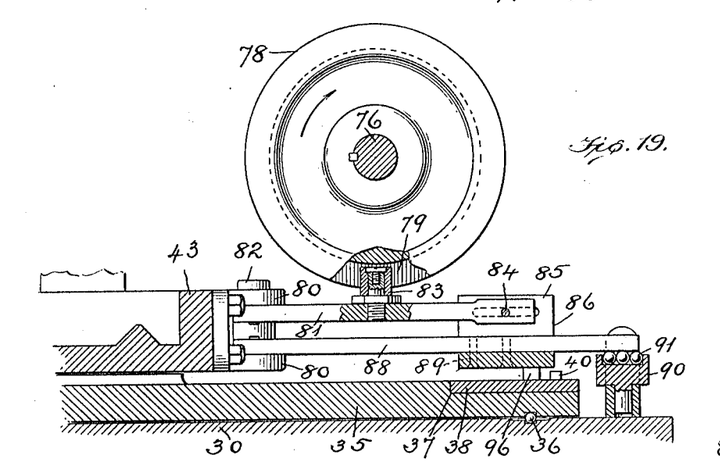
Fig. 19, shows the same lever devices in side elevation and the cam for oscillating them.
Figure 20:
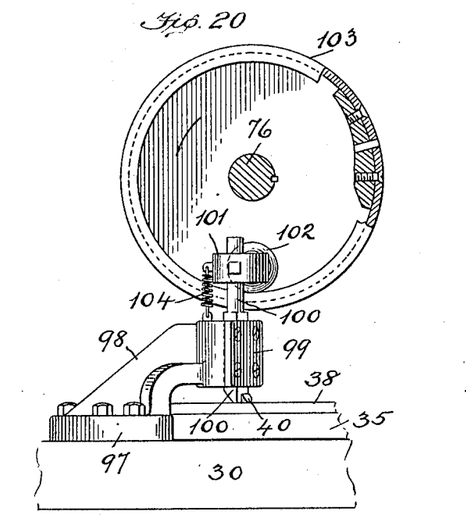
Figs. 20, 21 and 22 illustrate three views of the pawl and cam actuating devices to lock the pin table against rotation.
Figure 21:
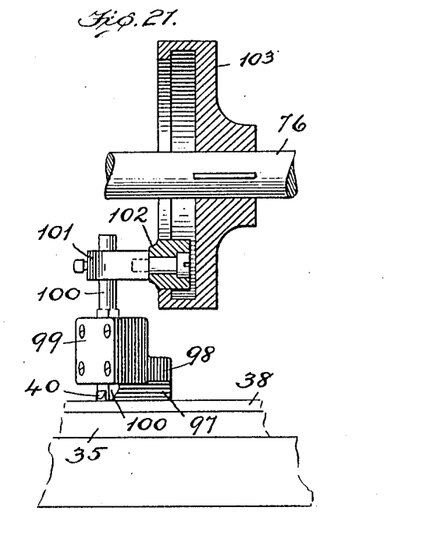
Figure 22:
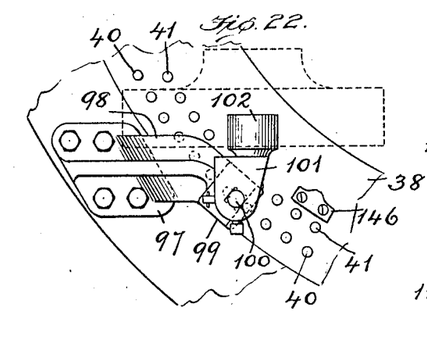
Figure 23:
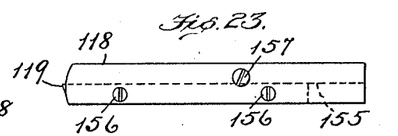
Figs. 23, 24, 25 and 26 show four views of the individual tool holders detached with a cutting tool in place therein.
Figure 24:
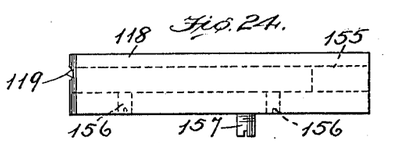
Figure 25:
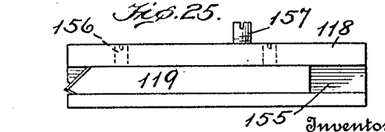
Figure 26:
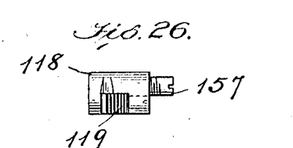

At the outer edge, the upper side of the carriage or disk is provided with a circular recess 37, as seen in Figs. 3 and 19, of the drawings, and a ring plate 38, is seated in said recess and rigidly secured to the upper side of the disk by means of screws 39. By preference, the ring plate is formed of a plurality of sections so that one section, if damaged by any cause, may be removed and replaced by a new section, thereby avoiding a renewal of an entire ring.

Figures 1, 27:
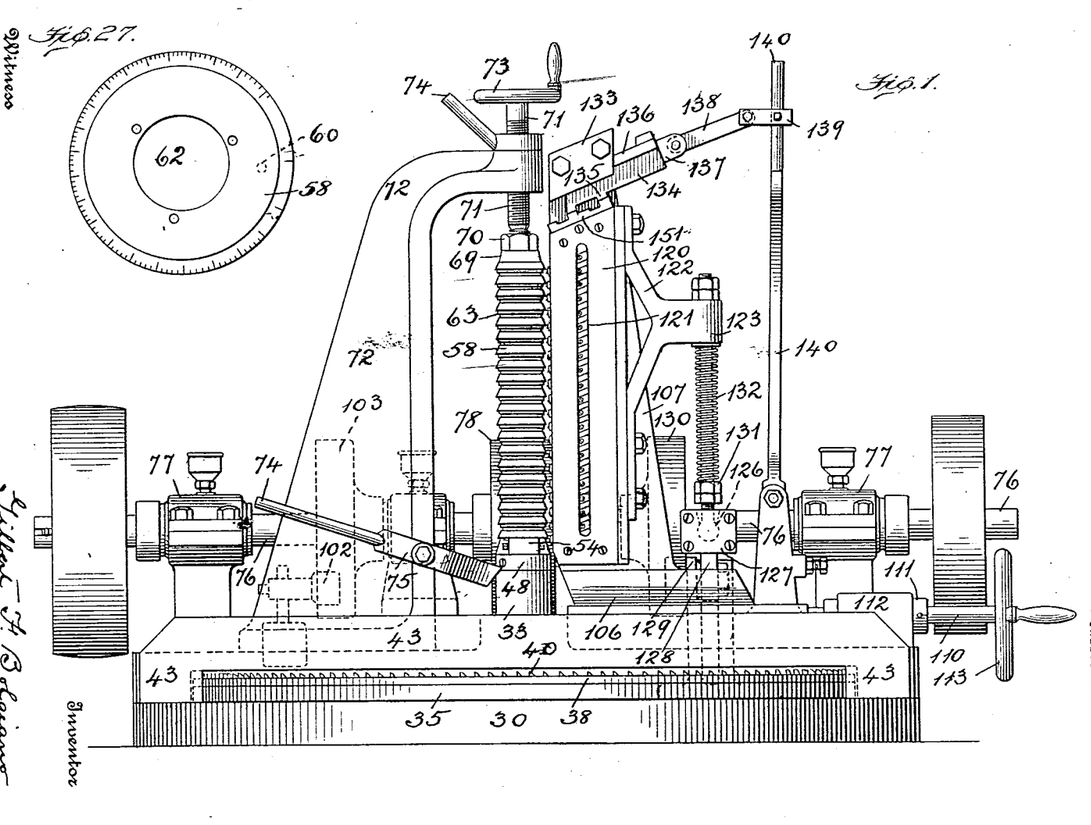
Figure 1 shows the improved machine in front elevation.
Fig. 27, illustrates in top plan one of the time rings on a full size scale with the graduation thereon.
Figure 17:
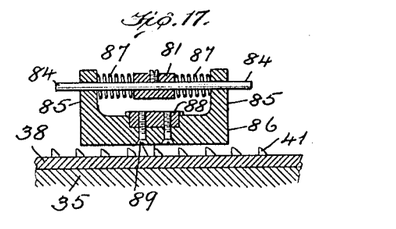
Fig. 17, shows a cross-sectional detail through the same,—the section being taken on the line 17—17 of Fig. 16.
Figure 18:
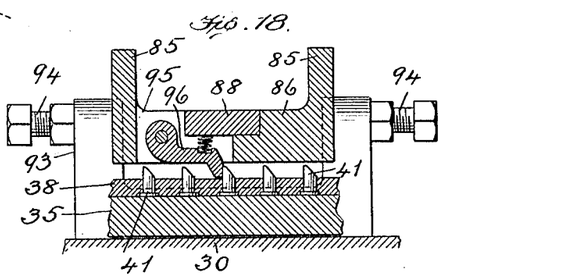
Fig. 18, illustrates an enlarged cross-sectional detail through the same parts, as they would appear if viewed on the line 18—18 of Fig. 16.

The ring-plate 38, is provided on its upper side with two circular series of vertically-extending pins 40 and 41, respectively,—the upper ends of the pins all being beveled on one side, as shown in Figs. 1, 17 and 18 of the drawings.

Figure 8:
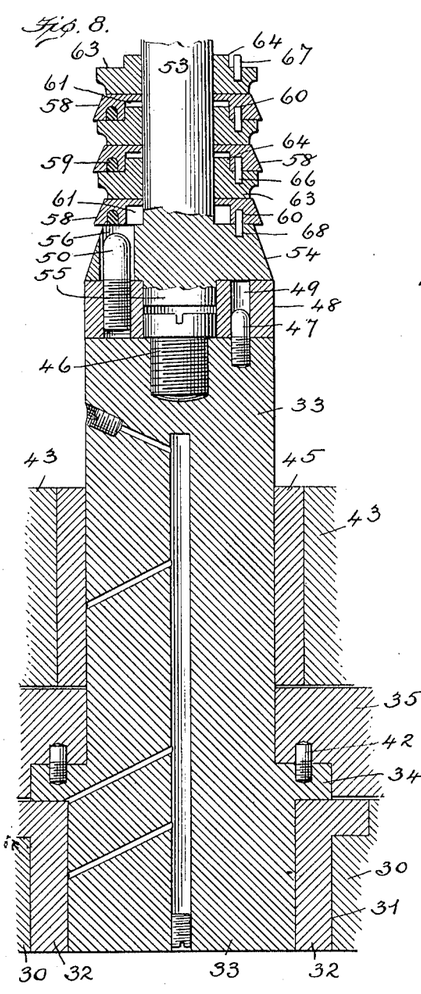
Fig. 8, shows an enlarged sectional detail through the lower portion of the spindle and the means for sustaining the same.

The ring plate 38, and disk 35, are movable together and the disk is rigidly connected to the rest or post by means of pins or dowels 42, which project from the flange 34, into the under side of the disk, as clearly shown in Fig. 8, of the drawing, so that the post, disk and ring-plate will all rotate together,—power being transmitted from the ring-plate through the disk to the post, as will presently be explained.

A bridge-bar 43, extends diametrically across from one side to the other of the table and has its opposite ends secured to said table by bolts 44. This bar bridges over the disk 35, and ring-plate 38, to permit the latter to rotate in a horizontal plane beneath it, and at the center, this bar is provided with a bearing hole with a bushing 45, therein, and the central post 33, extends vertically through and has bearing in said bushing, as clearly seen in Figs. 3 and 8, of the drawings.

Figure 9:
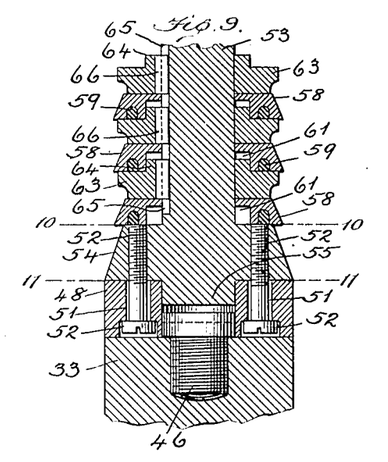
Fig. 9, illustrates a similar view but taken on a line at right angles to that shown in Fig. 8.

Referring to Figs. 8 and 9, of the drawings, it will be seen that the upper end of the post 33, is provided with a central vertical screw 46, whose head forms a vertical circular projection at said post-end, and at one side of the screw said post-end carries a dowel pin 47, which also projects vertically therefrom.

Figure 10:
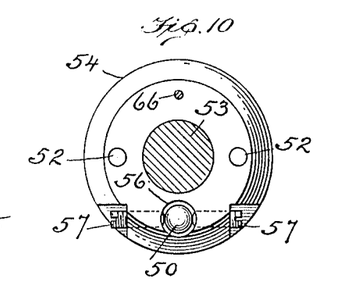
Figs. 10 and 11 show cross-sectional details through the spindle,—the sections being taken respectively on the lines 10—10 and 11—11 of Fig. 9.

An adjusting ring 48, preferably of the same diameter as the post, is seated on top of the latter around the circular head, and this ring has a vertical passage 49, into which the dowel pin 47, snugly enters so as to lock the ring against rotation independently of the post and require the ring and post to rotate together. This ring also, has a vertical pin 50, projecting therefrom, which is shown in Figs. 8, 10 and 11 of the drawings and the purpose of which will presently be explained.

Figure 11:
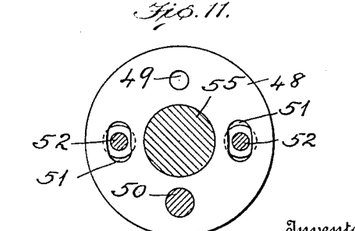

The adjusting ring 48, is also provided at diametrically opposite sides with vertical slots 51, seen in Figs. 9 and 11, and bolts 52, extend loosely up through said slots and project at the upper side of the ring.

An arbor 53, extends vertically above the adjusting ring and post and the lower end of this arbor is provided with a circular flange or head 54, with a beveled circumferential wall and with a circular projection 55, depending from its under end.

The head 54, of the arbor seats on top of the adjusting ring 48, and the depending projection 55, enters the central opening of the ring and serves to center the two. The head also has a vertical opening 56, into which the pin 50, on the ring loosely projects and horizontal adjusting screws 57, shown clearly in Fig. 10, extend through the head 54, from opposite sides of the opening 56, so that their inner ends may be made to impinge against the pin 50, at opposite sides and thereby provide for a delicate circumferential adjustment of the head and arbor with respect to the pin 50, and the ring 48, which carries said pin. The ring and arbor-head are held against vertical separation by means of the bolts 52, which extend up through the slots 51, in the adjusting ring, and the slots, being larger than the bolts, permit the delicate adjustment in a circumferential direction which the adjusting screws 57, effect.

It will thus be seen that the arbor 53, head 54, and adjusting ring 48, are all secured together, and that while the pin 47, locks them into rotary engagement with the post 33, they may be lifted from the post.

The purpose of the arbor is to receive a series of timing rings in which the circumferential graduations are to be cut, and these rings are mounted on the arbor so as to be held against independent rotation and are suitably spaced with respect to each other so as to permit a graduation to be cut in each one at a single operation of a cutting mechanism as will presently be described.

The timing rings 58, are provided with powder grooves in the under side of which the powder 59, is packed prior to the formation of the graduations in the ring, and each ring is provided in its under side with a hole 60, for a purpose presently to be explained. The under side of each ring is also provided with an annular recess 61, which is utilized in the assembly of the rings in a fuse structure, and obviously each ring has a central circular opening 62.

In assembling the rings on the arbor 53, it has been found desirable to separate or space them one from another and to do this a separator or spacing ring 63, is interposed on the arbor between each two time rings. Each separator has an annular projection 64, around its upper side which enters the annular recess 61, in the bottom of the time ring next above it, and the lower side of each separator seats on the flat upper side of the time ring next beneath it as shown clearly in Figs. 8 and 9, of the drawing. To lock the separator rings against independent rotation on the arbor, the latter is provided with a key-way 65, and each separator is provided with a key 66, which projects into said arbor key-way. To lock the time rings against independent rotation each separator ring 63, has a pin 67, which enters the hole 60, in the bottom of the time ring above it, and the lowermost time ring is held against rotation by means of a pin 68, in the upper side of the arbor head 54, which enters the hole 60, in the bottom of said lowermost ring, as seen in Fig. 8.

The upper end of the arbor is slightly reduced and screw-threaded so that a cupped washer 69, may be passed over said threaded end, seated on the uppermost time ring and held down by means of a nut 70. The extreme upper end of the arbor is provided with a conical recess so that the point-end of a clamping screw 71, may enter therein and form a bearing as well as a clamp so the arbor may be turned intermittently during the cutting of the graduations on the rings.

The clamping screw 71, screws through the upper end of a bearing bracket 72, which is sustained on the bridge bar 43, and a hand wheel 73, is provided on the screw for convenience in operating the same.

A locking bar 74, is preferably provided on the clamping screw 71, to lock the same against accidental rotation.

For convenience in freeing the arbor after the screw 71, has been retracted, a jolting lever 75, is pivoted to the side of the bracket 72, and has one end projecting beneath the lowermost time ring so that by swinging the lower end of said bar up with a jolt the arbor may be readily freed and lifted out.

It has heretofore been stated that the post 33, is intermittently rotated or moved step-by-step through the disk 35, ring-plate 38, and series of pins 41, on the latter, and it has been explained that the movement of the post is imparted to the arbor and the time rings carried thereon. The means employed to operate against the pins and impart movement to the said devices will therefore now be explained; reference being made particularly to the structures disclosed in Figs. 2, 7, 16, 17, 18 and 19, of the drawings.

At the rear of the bridge bar there is provided a horizontal shaft 76, which is sustained in suitable bearings 77, and a cam 78, is mounted on said shaft and is provided with a circumferential groove 79. A bracket 80, is rigidly attached to the rear edge of the bridge bar and a horizontal lever 81, has one end pivotally sustained by a vertical pin 82, that passes down in said bracket, and said lever extends rearwardly and beneath the cam 78, so that a roller 83, on the upper side of the lever may enter the cam-groove 79, and effect a horizontal oscillation of the lever at each revolution of the cam. The rear end of the lever 81, is provided with a cross-pin 84, which is rigid therewith and this pin extends laterally from opposite sides of the lever and passes through horizontal slots in the vertical side walls 85, of a ratchet holder 86. Springs 87, encircle the ends of the cross-pin and are interposed between the side walls and the lever 81, as clearly seen in Figs. 16 and 17.

Beneath the lever 81, there is a second lever 88, one end of which is also pivotally sustained to the bracket 80, by the vertical pin 82, and the lower lever extends horizontally through the ratchet holder 86, and is rigidly secured to the latter by screws or bolts 89.

The rear end of the lower lever 88, projects to the rear of the ratchet holder and rests upon a lever support 90, in the upper side of which there are antifriction devices, such as balls 91, and the opposite vertical faces of this lever-end are provided with hardened metal blocks 92, which will withstand blows when they are brought against stop devices, as will presently be described.

An adjusting block or bracket 93, is rigidly secured to the upper side of the table and sustains two horizontal stop bolts 94,— one at each side of the rear end of the lower lever 88, and these bolts are capable of horizontal adjustment so that the positions of their inner stop-ends, with respect to the block 92, on the lever, may be varied.

The ratchet holder 86, is provided with a vertical slot 95, which opens at its bottom, and a ratchet 96, is pivotally mounted in said slot and has its operating end depending below the holder and in the path of the series of pins 41, which project up from the ring plate, as clearly shown in Fig. 18, of the drawing.

From the foregoing explanation it will be seen that as upper lever 81, is oscillated by the cam 78, it will impart a corresponding movement to the ratchet-holder 86, although by reason of the springs 87, the connection between the lever 81, and ratchet-holder is a yielding one which will allow the lever to make a somewhat greater throw than that given to the ratchet-holder. The oscillating movement of the ratchet-holder is directly applied to the lower lever 88, which sustains the ratchet-holder, and the back-and-forth movement of said lever 88, and ratchet-holder is given to the ratchet 96. The path through which the ratchet 96, swings, corresponds to the circular path or line of the pins 41, on the ring-plate 38, so that as the ratchet is swung in one direction (say to left when viewing Figs. 16 and 18) it will ride over from one side to the other of a pin 41, and engage the same on the rear side, then when the ratchet is swung in a reverse direction, (to the right) it will push the pin in front of it, forward and thus give the ring-plate 38, and disk 35, a partial rotary movement, which partial movement is transmitted to the post 33, and the arbor on which the time rings are carried. The extent of the step-by-step movement imparted to the ring-plate, and finally to the time rings, is determined mainly by the distance between the pins 41, and secondly the throw of the ratchet 96, in the ratchet holder.

It is deemed important to state at this point, that the graduations in time-rings are not evenly spaced around the circumference of the ring, but are arranged closer together through a portion of the circumference than at other portions in the circumference.

Figure 7:
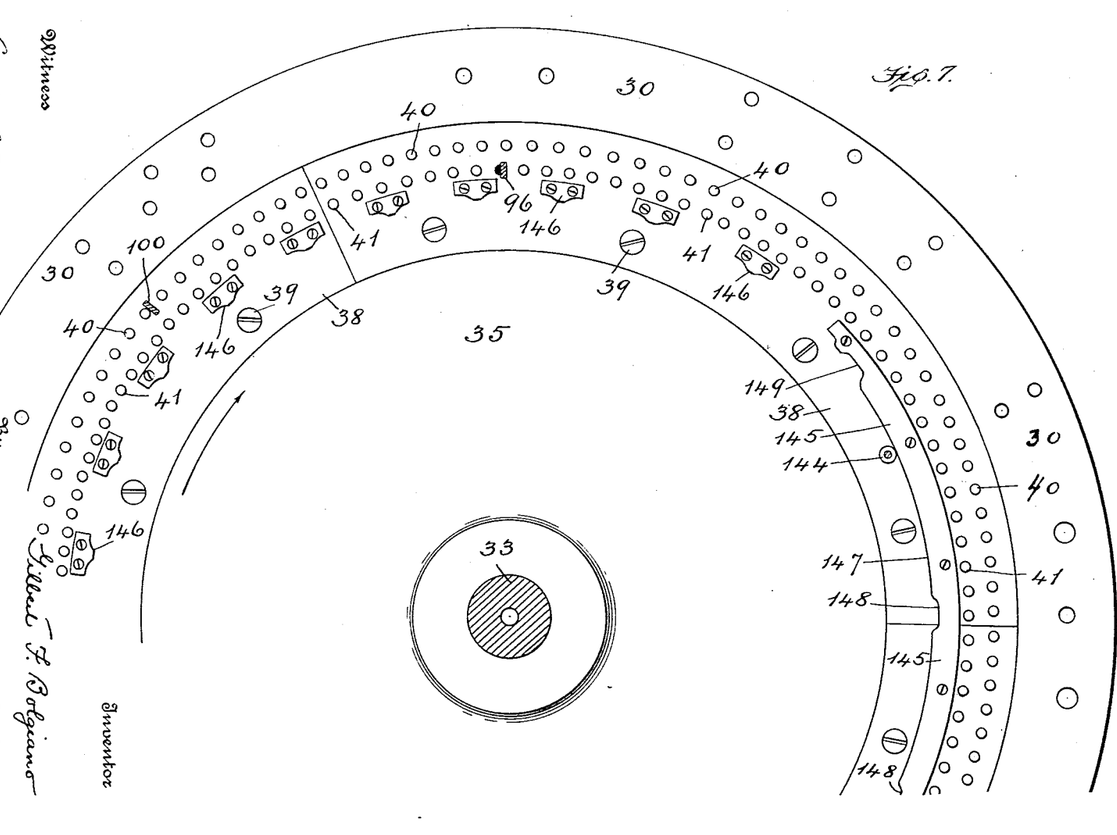
Fig. 7, illustrates in top plan a portion of the rotary table which carries the stop and pins which are employed to determine the long and short cuts and the width of space between the cuts.

To provide for this, the pins on the ring-plate 38, are spaced to correspond to the desired graduations to be cut on the time rings, and if a careful measurement of the spaces between the pins is made on Fig. 7, of the drawing, it will be found that those spaces vary, instead of being uniform. This fact makes it necessary to interpose some means between the cam 78, which gives a definite and positive throw to the parts it operates, and the ratchet 96, which acts on and moves the pins and ring-plate, which interposed means will enable the ratchet to be thrown far enough to operate on those pins that are separated the greatest distance, but which will limit the throw of the ratchet-moving parts while allowing the cam-actuated parts to make their full stroke. For these reasons lever 81, has an elastic or yielding connection with the ratchet-holder so the latter need not make as great a stroke as said lever and the ratchet-holder is limited in its stroke by the lever 88, which can only swing laterally as far as the stop-bolts 94, will permit.

In order to prevent a retrograde movement of the ring-plate when the ratchet 86, is making a return stroke to ride over and take position behind the next pin 41, and to lock said plate against such backward movement by any cause, I provide locking means for these parts which will now be explained, reference being made particularly to Figs. 2, 7, 20, 21 and 22 of the drawings.

A bracket 97, is secured to the upper marginal edge of the table 30, and is provided with an arm 98, which extends over the ring-plate 38. This arm has a guide box or housing 99, through which a vertical stop-pin 100, extends, and the upper end of the pin carries a laterally-extending arm 101, with a roller 102, at the end thereof.

A cam 103, is carried on shaft 76, and the roller 102, engages this cam so that for a moment, during each revolution of the cam the roller, arm and stop pin are raised but during the remainder of the revolution of the cam these parts are in the lowered position. A spring 104, normally draws the arm, pin and roller down to keep the latter against the cam.

The lower end of the stop pin 100, has position in the path of the pins 40, so that when the pin is down it has position immediately at the rear of a pin and therefore prevents the pin 40, and the ring plate from moving backward.

The spacing of the pins 40, corresponds to the spacing of the pins 41, but in view of the fact that the row 41, of pins is engaged at one side of the machine while the row of pins 40, is engaged at another side of the machine, the spacing between the pins in one row begins at a point in advance of the corresponding spacing of the pins in the other row so that the ratchet 96, will be engaging pins that have a spacing corresponding to the pins of the other row with which the stop device 100, is engaging.

The timing of the two cams 79 and 103, is such that just before cam 78, operates to move ratchet 96, forward, cam 103, will retract or raise the stop-pin 100, to free the ring plate and allow it to turn, and as ratchet 96, is completing its stroke, the stop pin 100, which has been lowered, will ride over the beveled face of the next pin 40, and drop behind the latter.

From the foregoing explanations it is believed to be clear how the time rings 58, are sustained on the arbor and are given a step-by-step rotation, and that the extent of the successive rotations vary according to the spaces between the spacing pins 41, so that if those pins are uniformly spaced, then the time rings will be moved equal spaces at each operation, but if the pins are spaced unequally the movements to the time rings will be correspondently unequal.

During each period of rest, every time-ring is scored or cut on its circumferential edge,—some of the cuts being long and the intervening cuts being short. The devices employed to make these circumferential cuts, scores or graduations on the rings, will therefore now be explained, reference being made particularly to Figs. 2, 3, 4, 12, 13, 14 and 15, of the drawings.

The upper side of the bridge-bar 43, is provided with guide ribs 105, on which the base 106, of a vertical guide bracket 107, is supported. Plates 108, at opposite sides of the bridge-bar hold the guide bracket down on said ribs. A threaded bore or passage 109, extends horizontally through the base 106, and a threaded shaft 110, with rigid collars 111, at opposite sides of a bearing 112, screws into the bore so that horizontal movement of the base and bracket may be effected by rotation of the shaft. A hand wheel 113, on the end of shaft 110, facilitates the operation of the latter.

Figures 12, 13:
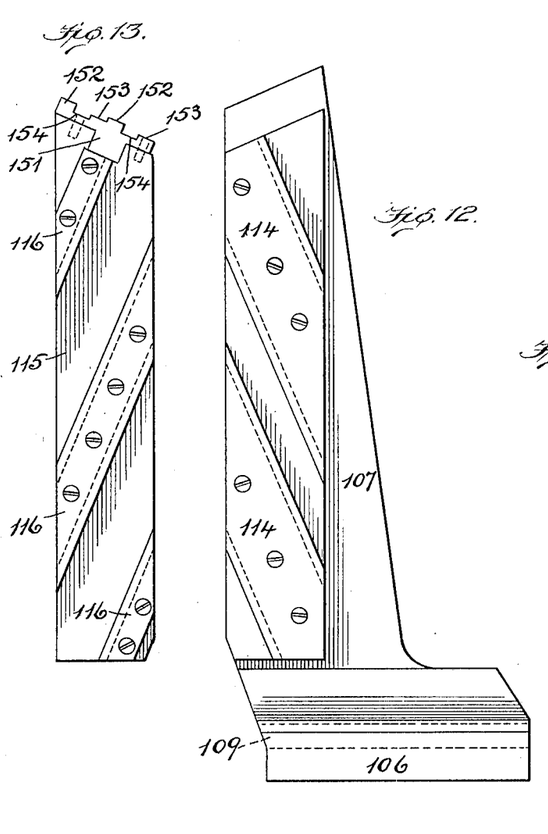
Fig. 12, illustrates a face view of the stationary guide bracket in which the cutter frame is guided.
Fig. 13, shows the inner guiding face of the cutter frame.
Figure 14:
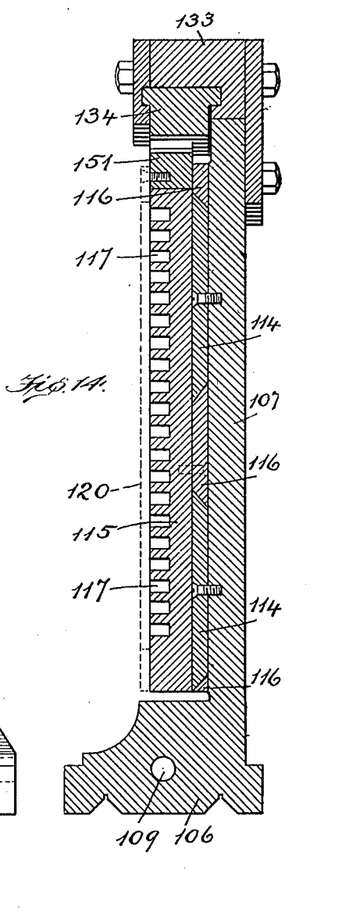
Fig. 14, illustrates a vertical sectional detail through the assembled guide-bracket and cutter frame.

The guide bracket 107, extends vertically at the side of the series of superposed time-rings 58, on the arbor, and its front face is provided with a series of undercut guide strips 114, which extend in an inclined direction, as clearly shown in Fig. 12, of the drawing.

At the front side of the guide bracket 107, there is provided a cutter frame 115, whose rear face is provided with a series of guide strips 116. These guide strips also extend in an inclined direction and fit between or slidably engage the inclined strips 114, on the guide bracket so that the cutter frame may have an inclined forward and backward movement with respect to the guide bracket for a purpose presently to be explained.

The outer face of the cutter frame 115, is provided with a series of inclined channels 117, each of which is to contain a cutter-holder 118, and cutter-tool 119, as will presently be explained. These channels are inclined, as clearly shown in Fig. 3, of the drawings, and the cutter-holders 118, project from the channels in a vertical row at the sides of the series of time-rings on the arbor. The channels 117, are open at the outer side of the cutter frame but a cover plate 120, is secured against the outer side of the frame to retain the holders in said channels. This cover plate is provided with a vertical slot 121, which is utilized to limit the downward movement of the cutter-holders in the channels of the cutter frame, as will presently more fully appear.

From the foregoing explanation together with reference to Figs. 1, and 3, of the drawings, it will be understood that the guide-bracket normally sustains the cutter-frame, cutter-holders and cutters, so that one cutter will be adjacent to each time-ring and that when the cutter-frame is moved forward and upward each cutter will make a cut or score on the circumference of the ring in front of it.

Figure 2:
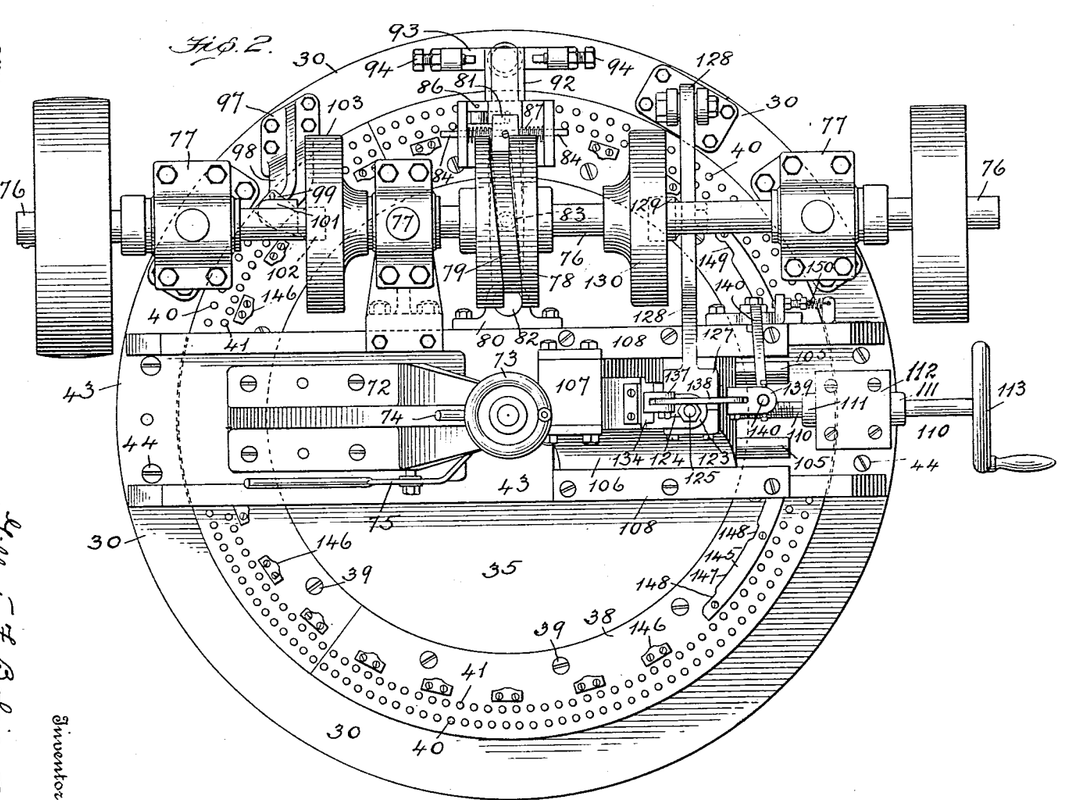
Fig. 2, illustrates the same in top plan.

The means for moving the cutter frame and cutters will now be explained, particular reference being made to Figs. 2, 3 and 4, of the drawings.

A bracket 122, is secured at the vertical edge of the cutter-frame and is provided with a laterally-projecting lug 123, and a vertical slot 124, is provided in the lug so that an actuating rod 125, can extend loosely through said lug. The rod 125, extends downwardly from the lug 123, and has a ball or rounded lower end 126, which seats in a socketed head 127, at the outer or forward end of a cam actuated lever 128. This lever extends rearwardly, and, as seen in Figs. 1, 2 and 4, of the drawing, is provided with a roller 129, at one side thereof which projects into and is operated by a cam 130.

The lower end of the rod 125, is provided with adjusting nuts 131, and a coiled spring 132, is wound about the rod between the said nuts, at its lower end, and the lug 123, at its upper end. By this means, the lifting power of the lever 128, and its head 127, is transmitted through the lower end of rod 125, to the nuts 131, and then through the coiled spring 132, to the lug 123, and cutter-frame 115, so that the means for moving the cutter-frame and cutters has an interposed yielding connection whereby the lever 128, and rod 125, may always make the same length of stroke but the cutter-frame and cutters may have a stroke that will vary in length.

It is thus to be understood that on each revolution of cam 130, lever 128, will be operated and rod 125, will be given an upward movement, and, if certain means presently to be explained is not positioned to prevent it, the cutter frame and cutters will make an upward stroke and cut a graduation or line, at each stroke, on the circumference of each ring.

By reference to Fig. 27, of the drawings, which shows a top plan view of one of the graduated time-rings 58, it will be noted that the beveled edge of the ring is provided with a series of short graduations and then a longer graduation. These variations in the length of graduations are automatically controlled and effected by means which will now be explained, and with particular reference to Figs. 2 to 7, inclusive of the drawings.

The upper end of the guide bracket 107, carries a grooved guide-block 133, in which a slidable stop block 134, fits. This stop block has two spaced-apart depending lugs 135, of equal length which depend from its bottom edge and also has a stop lug 136, at the outer end and upper edge which limits the inward movement of said stop-block into the guide-block. The stop block also has two ears 137, projecting from its outer end and a link 138, has one end pivotally connected to said stop-block-ears and its other end pivotally connected to an arm 139, that projects from the upper end of a rock-bar 140. The rock-bar 140, is bent laterally and extends downwardly at the rear side of the bridge-bar 43, and said bar is pivotally connected at 141, between its ends to a bracket 142, that is carried by and extends vertically above the bridge bar. The lower end 143, of the rock-bar carries a roller 144, which depends over and close to the ring plate 38, where it may engage and be operated by a cam rail 145, and a series of cam-blocks 146. By reference to Figs. 2 and 7, of the drawing the cam-rail and cam-blocks will be clearly seen on the ring-plate, and in Fig. 7, the roller 144, on the lower end of the rock-bar 140, is shown in contact with the long cam-surface 147, of the rail.

The cam rail has a cam-surface 147,—a shallow notch 148, and a deeper notch 149, against which the roller 144, will contact during the rotation of the ring-plate.

A spring 150, constantly pulls on the lower end of the rock-bar and keeps said end drawn outwardly toward the cam surfaces and tends to press the upper end of rock-bar 140, inwardly or toward the guide-block 133.

The three cam surfaces 147, 148 and 149 therefore determine three positions of the roller and rock-bar,—the surface or position 147, preventing any cut being made on the time rings; the surface or position 149, determining the short cuts and the surfaces or position 148, determining the long cuts that are to be made in the time-rings.

The position of the roller when between blocks 146, will be such as to make short cuts.

By reference to Fig. 7, it will be seen that each of the cam blocks 146, is located on that line or position which determines the long cuts, therefore when each cam block is reached a long cut on each time-ring will be made, as will now be explained.

By referring to Figs. 3, 5, 6 and 13, of the drawings it will be noted that the upper end of the cutter frame 115, carries a stop block 151, and that this block is provided along its upper surface with two high shoulders 152; two intermediate shoulders 153, and two low shoulders 154. This stop block 151, being attached to the cutter frame must move up and down with said frame and the extent of the movement will determine whether the cut, the cutters are to make, shall be long or short, or, no cut at all.

For example, in Fig. 3, the stop block 134, is so positioned that the lugs 135, are located directly over the high shoulders 152, on the stop-block of the cutter frame, and as the block 134, cannot move upward, and there is no space between the lugs 135, and shoulders 152, neither can the cutter frame move up to make a cut, so when in this position no cut will be made on the time ring, and rod 125, will simply compress the spring 132, when it moves upward under these conditions. This is all due to the fact that the lower end 143, of rock-bar 140, is moved inwardly by the cam-rail surface 147, and the upper end of said rock-bar has been swung out and drawn the stop-block 134, out so its lugs 135, will be over the high shoulders 152. The position therefore of the upper stop block 134, and its lugs 135, with respect to the lower block 151 and its shoulders, determines whether there shall be a long cut, a short cut or no cut.

Figures 4, 5, 6:
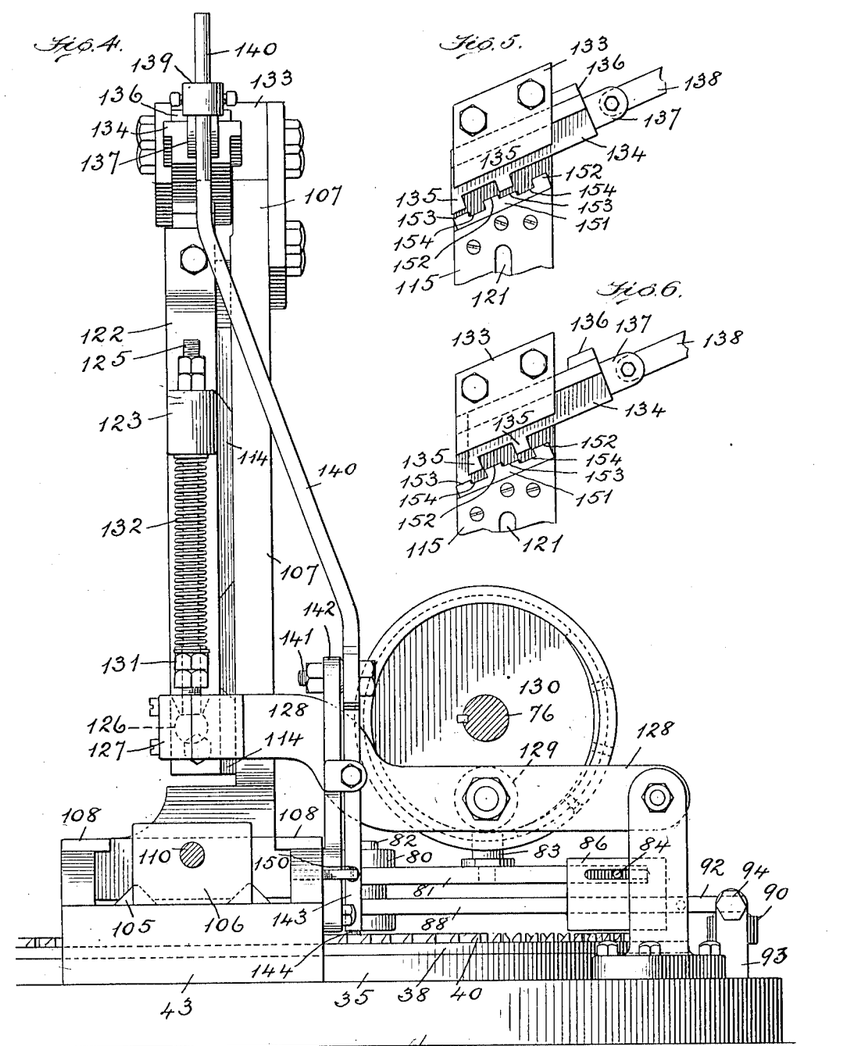
Fig. 4, illustrates the same in side elevation.
Figs. 5 and 6 show two front views of the devices for determining the short and long cuts to be made on the rings.

When the roller 144, on the lower end 143, of rock-bar 140, is in the outer-most position, as it will be in the deep notch 149, of the cam-rail and in the spaces between the spaced blocks 146, the upper end of rock-bar 140, will be thrown inwardly as in Fig. 5, and the stop blocks will have such relation with respect to each other as to permit sufficient movement of the cutter frame to make short cuts.

When the roller 144, however is moved into the position that cam surface 148, and blocks 146, on the ring plate will cause it to take, then the stop blocks 134, and 151, will be so positioned with respect to each other as to present the lugs 135, opposite the low shoulders 154, as seen in Fig. 6, and the cutter frame can then move sufficiently to make a long cut on each time ring.

Each cutter 119, is carried in a groove 155, of a cutter-holder 118, and is adjustably held therein by means of set screws 156, as seen in Figs. 23 to 26, of the drawings.

Figure 15:
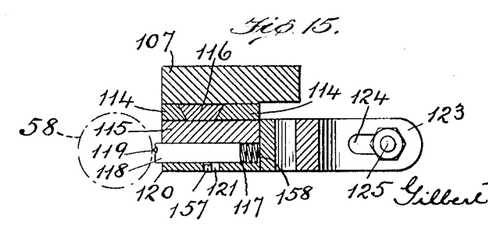
Fig. 15, shows a cross-sectional detail through the same as it would appear if sectioned on the line 15—15 of Fig. 3.
Figure 16:
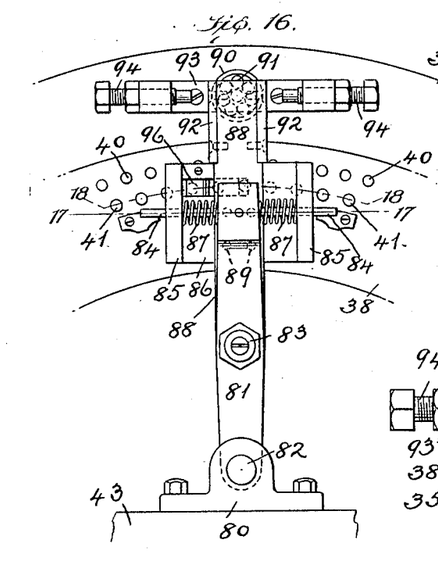
Fig. 16, illustrates in top plan, the lever devices and attached parts for effecting an intermittent step-by-step movement to the table.

A stop screw 157, projects from one side of each cutter-holder and when the holders are in position in the inclined channels 117, of the cutter frame, as shown in Figs. 3 and 15, of the drawings, the stop screws 157, project outwardly into the slot 121, of the cutter plate 120. A spring 158, is placed in each channel 117, of the cutter-frame and exerts a constant pressure on the inner end of each cutter-holder which yieldingly presses each cutter-holder and cutter therein so as to project the same at the lower end of each channel. The stop screws 157, therefore, by engaging the vertical wall of slot 121, serve to limit the outward movement of the cutter-holders and cutters.

From the foregoing explanations it is to be understood that after the plain time-rings 58, have had their grooves filled with fuse powder 59, they are assembled on the arbor and placed in the machine which is then started to rotate. At each revolution of the cam-shaft 76, the ring plate is given a partial rotation, and then locked; the stop block 134, is adjusted to determine the length of cut or no cut, according to the cam-rail and cam blocks on the ring plate; the cutter frame is moved upwardly a greater or lesser distance according to the length of cut to be made, or held against movement if no cut is to be made and upon the return of the cutter frame, the ring-plate is again moved to impart a like movement to the arbor and turn the time rings the proper space for the next cut.

After all the cuts or graduations have been made in the time rings, the machine will be stopped and locking screw 71, will be retracted to free the upper end of the arbor 53, and if the arbor is stuck in the post 33, jolting lever 75, may be operated to lift the arbor and graduated rings from the post, and another arbor previously supplied with rings will be put into position.

The construction of the machine is such that time-rings of various diameters may be cut because the cutter-frame and guide bracket may be moved toward or from the arbor to adjust the positions of the cutters with respect to the rings.

Having described my invention what I claim is:—

1. In a machine for cutting graduations in time rings, the combination with means for holding the ring, of cutting means; automatic means for turning the ring step by step with respect to the cutting means; means for reciprocating the cutting means always in the same plane, and means for automatically varying the stroke of the cutting means between successive cuts to make short and long cuts in the ring.

2. In a machine for cutting graduations in time rings, the combination with means for holding the ring that is to be cut, of means for rotating said ring step by step; reciprocating cutting means adjacent the periphery of the ring; means for automatically varying the stroke of the cutting means between successive cuts to make long and short cuts and means for automatically varying the rotating feed of the ring during its intermittent rotations to effect a variation in the width of spaces between successive cuts.

3. In a machine for cutting graduations in time rings, the combination with means for holding the ring that is to be cut, of reciprocating cutting means; means for intermittently turning the ring step-by-step with respect to the cutting means to vary the degree of rotation between successive cuts whereby to vary the width of spaces between the cuts, and means to prevent movement of the cutting means while the turning means makes a plurality of intermittent turns to leave uncut spaces on the ring.

4. In a machine for cutting graduations in time rings, the combination with means for holding a plurality of rings, of rotary means for controlling and intermittently moving said rings; a plurality of cutters at the side of said ring-holding means; means for intermittently moving all the cutters and means operated by the said rotary means for varying the stroke of the cutters.

5. In a machine for cutting graduations in time rings, the combination with an arbor to hold a plurality of time rings, of means for sustaining a plurality of cutters; rotary means for sustaining the arbor; means for reciprocating the cutters and their sustaining means; means carried by the rotary means for determining the extent of movement of the arbor, means for varying the stroke of the cutter-sustaining means and cutters, and means also carried by the rotary means for controlling the stroke-varying means.

6. In a machine for cutting graduations in time rings, the combination with an arbor to hold a plurality of time rings, of means for sustaining a plurality of cutters; means for effecting a movement of the cutter-sustaining means in a direction toward and from the arbor; stop means in the path of the cutter-sustaining means and movable into a plurality of positions to allow the sustaining means to vary its stroke, and means for moving said stop means operating automatically between successive strokes of the cutters.

7. In a machine for cutting graduations in time rings, the combination with an arbor to hold a plurality of time rings, of means for sustaining a plurality of cutters; means for effecting a movement of the cutter-sustaining means in a direction toward and from the arbor; stop means in the path of the cutter-sustaining means and movable into a plurality of positions to allow the sustaining means to vary its stroke; rotary means for intermittently moving the arbor and means moving with the rotary means for controlling the movement of the said stop means.

8. In a machine for cutting graduations in time rings, the combination with means for sustaining a plurality of rings, of means for carrying a plurality of cutters; means for moving said cutter-sustaining means toward and from the cutting position; stop means in the path of the cutter-sustaining means and movable into one of a plurality of positions at a time to vary the stroke of the cutter-sustaining means; rotary means having a series of cam devices thereon and means operated by said cam devices for shifting the stop means.

9. The combination with means for sustaining a plurality of rings, of a rotary element; means for intermittently operating the rotary element; cutter-carrying means having a series of cutters; stop-means movable cross-wise of the path of the cutter-carrying means and having a plurality of stop positions; means connected with the stop-means and extending to a point adjacent the rotary element and means carried by the rotary element for intermittently actuating the stop-means connection.

10. The combination with a rotary element, of means for sustaining a plurality of rings; means for intermittently operating the rotary element and imparting a like movement to the rings; cutter-carrying means having a series of cutters; means for operating said carrying means; stop means movable across the path of the cutter-carrying means to vary the stroke of the same; cam means carried by the rotary element; means operated by the cam means and connected with the stop means to move the latter and means for varying the degree of movement of the rotary means and rings.

11. The combination with a rotary element, of an arbor extending above said element; means for securing a series of time rings on the arbor; a cutter frame carrying a series of cutters; means for reciprocating said frame; a stop device movable across the path of the cutter-frame; cam devices on the rotary element; means operated by said cam devices and connected with the stop device for automatically moving the latter between successive strokes of the cutter frame and cutters, and means for imparting a step-by-step movement to the rotary element.

12. The combination with a ring-plate, of a series of cams carried by the ring-plate; means for intermittently moving the ring-plate; a cutter-frame carrying a series of cutters; means for reciprocating the frame and cutters; a reciprocating stop device to engage the frame and limit its stroke; means operated by the cams on the ring-plate for moving the stop device and rotary means for carrying a series of time rings to be cut.

13. The combination with a rotary device, of an arbor extending above and movable with the rotary device; a ring-plate traveling with the rotary device; a series of cams on the ring plate; means for intermittently moving the ring-plate, rotary device and arbor; a cutter-frame carrying a series of cutters; yielding means for reciprocating the cutter-frame; a stop device to vary the stroke of the cutter-frame and means operated by the cams on the ring-plate for actuating the stop device.

14. The combination with a rotary device, of an arbor extending above and movable with the rotary device; a ring-plate traveling with the rotary device; a series of cams in the ring plate; means for intermittently moving the ring-plate, rotary device and arbor; a cutter-frame carrying a series of cutters; a stop device carried by the cutter-frame and having a plurality of stop shoulders; a movable stop device to coact with the cutter-frame stop device; means for moving the cutter-frame and lever means having one end connected with the movable stop device and its other end actuated by the cams on the ring-plate.

15. The combination with a ring plate, of a series of cams carried by said plate; a series of devices also carried by said plate by which the same may be advanced step-by-step; ratchet means for engaging said devices to move the ring-plate; an arbor for carrying a plurality of time rings to be graduated, said arbor moving with the ring plate; a series of cutters at the side of the arbor; means for reciprocating all the cutters simultaneously and stop means controlled by the cams on the ring plate for varying the stroke of the cutters.

16. The combination with a series of cutters, of means for reciprocating the cutters; means for varying the stroke of the cutters to cause them to make long and short cutting strokes; an arbor; means for holding a series of time rings on the arbor in spaced relation and means for turning all the rings simultaneously step-by-step.

In testimony whereof I affix my signature in the presence of two witnesses.

GILBERT F. BOLGIANO.

Witnesses:
PAUL M. KUEHN,
S. R. SHORES.